US011163903B2

(12) United States Patent
Ohtake

(10) Patent No.: US 11,163,903 B2
(45) Date of Patent: Nov. 2, 2021

(54) DOCUMENT MANAGEMENT APPARATUS, DOCUMENT MANAGEMENT SYSTEM, AND NON-TRANSITORY COMPUTER READABLE MEDIUM

(71) Applicant: FUJIFILM BUSINESS INNOVATION CORP., Tokyo (JP)

(72) Inventor: Yu Ohtake, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 505 days.

(21) Appl. No.: 16/025,042

(22) Filed: Jul. 2, 2018

(65) Prior Publication Data

US 2019/0018977 A1 Jan. 17, 2019

(30) Foreign Application Priority Data

Jul. 12, 2017 (JP) .............................. JP2017-135893

(51) Int. Cl.
*G06F 16/00* (2019.01)
*G06F 21/62* (2013.01)
*G06F 21/31* (2013.01)
*G06F 16/22* (2019.01)

(52) U.S. Cl.
CPC ...... *G06F 21/6227* (2013.01); *G06F 16/2228* (2019.01); *G06F 21/31* (2013.01); *G06F 21/6245* (2013.01); *G06F 2221/2141* (2013.01)

(58) Field of Classification Search
CPC ...... G06F 21/6227; G06F 16/10; G06F 16/22; G06F 16/31; G06F 16/41; G06F 16/51; G06F 16/71

USPC .................................................. 707/783, 711
See application file for complete search history.

(56) References Cited

U.S. PATENT DOCUMENTS

| | | | |
|---|---|---|---|
| 9,002,811 B2 | 4/2015 | Kan et al. | |
| 2009/0210945 A1* | 8/2009 | Kato ....................... | G06F 21/62 726/26 |
| 2012/0233209 A1* | 9/2012 | Cheng ..................... | G06F 16/22 707/770 |
| 2014/0331338 A1* | 11/2014 | Serita .................. | G06F 21/6227 726/30 |

(Continued)

FOREIGN PATENT DOCUMENTS

| | | |
|---|---|---|
| JP | 2001344245 A | 12/2001 |
| JP | 2011081642 A | 4/2011 |
| JP | 5549596 B2 | 7/2014 |

OTHER PUBLICATIONS

May 18, 2021 Office Action issued in Japanese Patent Application No. 2017-135893.

*Primary Examiner* — Alexandria Y Bromell
(74) *Attorney, Agent, or Firm* — Oliff PLC

(57) ABSTRACT

A document management apparatus includes a first memory that stores a first search index generated for confidential information included in document data, a second memory that stores a second search index generated for non-confidential information other than the confidential information, a third memory that stores the document data including the confidential information concealed therewithin, and a controller that searches the document data by switching between the first search index and the second search index depending on a right of a user, and outputs a search result.

14 Claims, 6 Drawing Sheets

(56) References Cited

U.S. PATENT DOCUMENTS

2016/0048543 A1* 2/2016 Kunapuli ......... G06Q 10/06393
   707/690
2018/0314731 A1* 11/2018 Mathew ............. G06F 16/2272
   707/707

* cited by examiner

DOCUMENT MANAGEMENT APPARATUS, DOCUMENT MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-135893 filed Jul. 12, 2017.

BACKGROUND

(i) Technical Field

The present invention relates to a document management apparatus, a document management system, and a non-transitory computer readable medium.

(ii) Related Art

Techniques of searching a document including secret information or confidential information are available.

Search may be performed on a document including secret information (hereinafter generally referred to as confidential information). One technique contemplated may assign an access right to each target index including characters and location information. In such a case, an operation to determine whether each target index has an access right is performed during the search, leading to an increase in processing costs. A system that searches a vast amount of documents, such as 10 million documents, may be subject to a substantial delay in processing.

SUMMARY

According to an aspect of the invention, there is provided a document management apparatus. The document management apparatus includes a first memory that stores a first search index generated for confidential information included in document data, a second memory that stores a second search index generated for non-confidential information other than the confidential information, a third memory that stores the document data including the confidential information concealed therewithin, and a controller that searches the document data by switching between the first search index and the second search index depending on a right of a user, and outputs a search result.

BRIEF DESCRIPTION OF THE DRAWINGS

Exemplary embodiments of the present invention will be described in detail based on the following figures, wherein.

DETAILED DESCRIPTION

An exemplary embodiment of the present invention is described with reference to the drawings.

Figure 1:
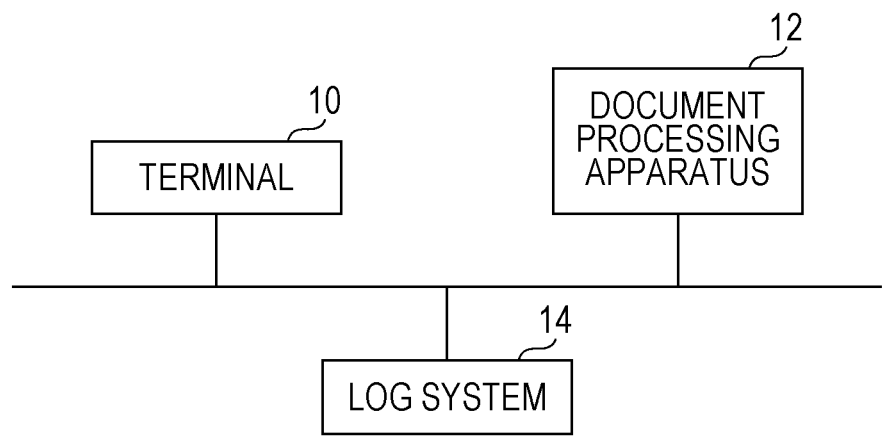
FIG. 1 illustrates a system configuration of a document management system of an exemplary embodiment.

FIG. 1 illustrates a system configuration of a document management system of the exemplary embodiment. The document management system includes a terminal 10, a document processing apparatus 12, and a log system 14. The terminal 10, the document processing apparatus 12, and the log system 14 are connected to each other via a communication network for data communication. The communication network may be a local area network and/or the Internet, and may be an exclusive network or a public network. The communication network may be a wired network and/or a wireless network.

The terminal 10 may be a personal computer (PC), a tablet terminal, or a smart phone, and may be a device that a user uses to search a document.

The document processing apparatus 12 is a multi-function apparatus, an image forming apparatus, or a PC, which processes a document. The document processing apparatus 12 supplies a processed document to the log system 14 via the communication network. For example, the document processing apparatus 12 as a multi-function apparatus obtains document data by scanning a document, and then supplies the document data to the log system 14 via the communication network.

The log system 14, functioning as a document management apparatus, receives and stores document data processed by the document processing apparatus 12. If confidential information is included in the received document data, the log system 14 sorts the document data into the confidential information and non-confidential information while at the same time generating and storing a confidential information index for the confidential information and a non-confidential information index for the non-confidential information. The log system 14 stores the received document data after performing a predetermined concealment operation on the confidential information. Upon receiving a search request from the terminal 10, the log system 14 searches a document by switching between the confidential information index and the non-confidential information index, and returns a search result to the terminal 10.

In accordance with the exemplary embodiment, the log system 14 stores the document data in which the confidential information is concealed. A user having no special right is unable to search using the confidential information index, and thus confidentiality is maintained. Even a user having no special right is able to search using the non-confidential information index. A user having a special right is able to search using the confidential information index. Searchability is thus maintained. The word "confidentiality" means that a user who has no right to access the confidential information is not allowed to make reference to the confidential information. The word "searchability" means that even if a user who has no right to access the confidential information is still able to search information and recognize contents of the information other than the confidential information.

Figure 2:
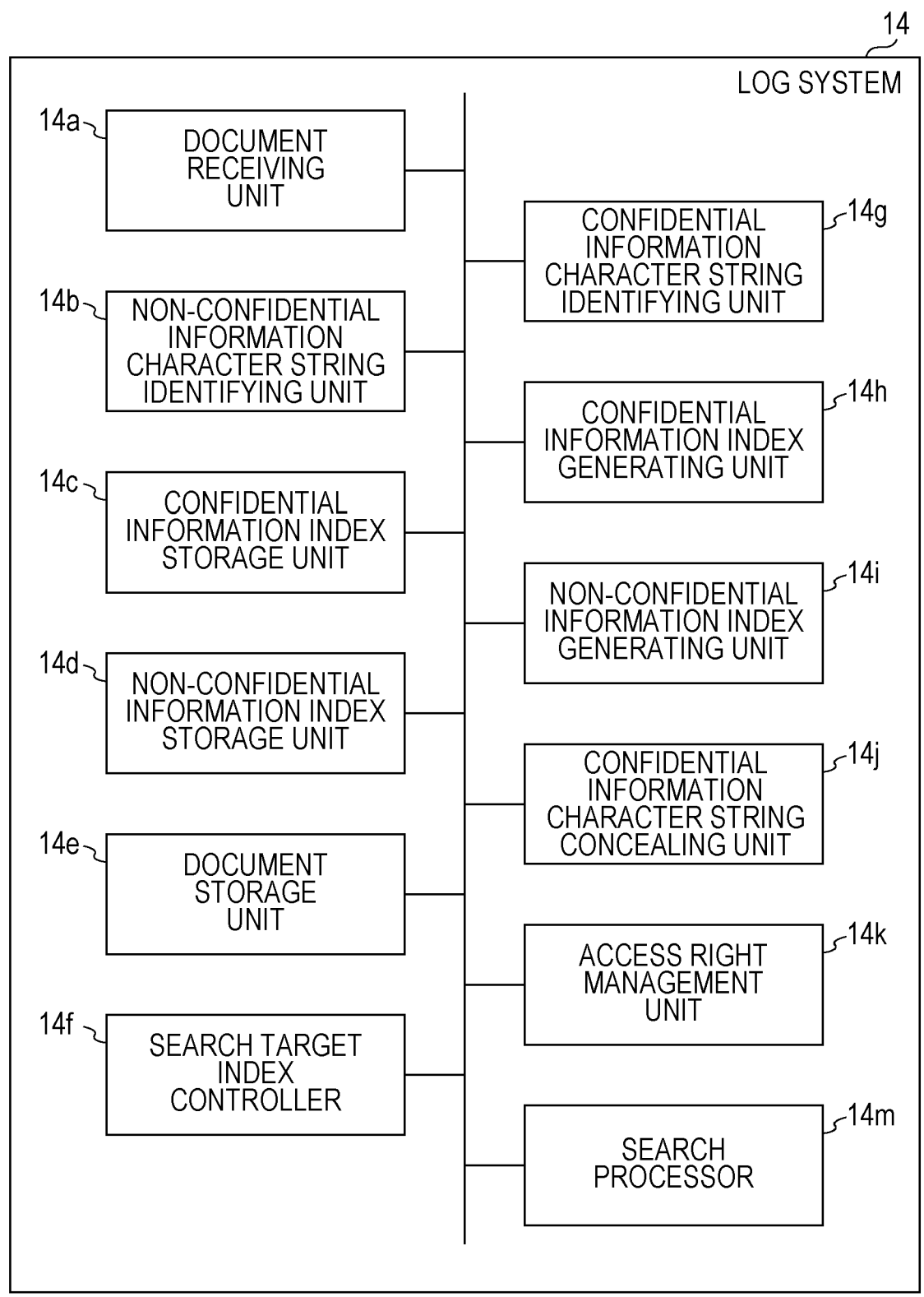
FIG. 2 is a functional block diagram illustrating a log system of the exemplary embodiment.

FIG. 2 is a functional block diagram illustrating the log system 14.

The log systems 14 includes, as functional blocks, a document receiving unit 14a, a non-confidential information character string identifying unit 14b, a confidential information index storage unit 14c, a non-confidential information index storage unit 14d, a document storage unit 14e, a search target index controller 14f, a confidential information character string identifying unit 14g, a confidential information index generating unit 14h, a non-confidential information index generating unit 14i, a confidential information character string concealing unit 14j, an access right management unit 14k, and a search processor 14m.

The document receiving unit 14a receives the document data supplied from the document processing apparatus 12. The document data may include not only character data but also image data. The image data included in the document data may include, in addition to a picture pattern image such as a photograph and a graph, a line image and a character image.

The confidential information character string identifying unit 14g identifies a character string of the confidential information included in the document data by a character string search according to a regular expression (a character string pattern composed of normal characters and special characters) or a simple character string search. The regular expression for identifying the confidential information may include a form, such as a credit card number, an address, or a personal number, and the regular expression and the character string corresponding to the confidential information are set in advance and registered by an administrator in the log system 14. If a process target is text data, the confidential information is searched for in the text data, and if the process target is image data, the image data is converted into text data through optical character recognition (OCR), and the confidential information is then searched for.

The non-confidential information character string identifying unit 14b identifies, as the non-confidential information character string, a character string other than a character string, identified as the confidential information by the confidential information character string identifying unit 14g, out of the received document data.

The confidential information index generating unit 14h generates, as a first search index, a confidential information index for the character string identified by the confidential information character string identifying unit 14g. The confidential information index includes a document data identifier that identifies document data (currently under process) including the character string identified as the confidential information character string, and location information that identifies a location of the confidential information character string in the document data.

The confidential information index storage unit 14c, functioning as a first memory, stores the confidential information index generated by the confidential information index generating unit 14h. A user having a special right to access the confidential information is entitled to access the confidential information index storage unit 14c.

The non-confidential information index generating unit 14i generates the non-confidential information index as a second search index for the character string identified by the non-confidential information character string identifying unit 14b. The non-confidential information index includes a document data identifier identifying the document data (currently under process) including the character string identified as the non-confidential information string and location information identifying a location of the non-confidential information character string in the document data.

The non-confidential information index storage unit 14d, functioning as a second memory, stores the non-confidential information index generated by the non-confidential information index generating unit 14i. The non-confidential information index storage unit 14d is accessible through an access right different from the access right through which the confidential information index storage unit 14c is accessible, More specifically, even a user who has no right to access the confidential information may access the non-confidential information.

The confidential information character string concealing unit 14j conceals the character string identified by the confidential information character string identifying unit 14g by converting the character string into an unviewable state which a user is unable to view. Specifically, the unviewable states include deletion and blackout, but are not limited to these states. The document data with the confidential information concealed is data that does not include the confidential information. By processing the document data into "concealed document data", the confidential information remains unviewable even if the document data stored in the log system 14 leaks out. Confidentiality of the document data is thus maintained.

The document storage unit 14e, functioning as a third memory, stores the document data with the confidential information thereof concealed by the confidential information character string concealing unit 14j.

The access right management unit 14k manages the access right of each user. Specifically, the access right management unit 14k references a table that defines the access right of each user in advance, and determines the access right of the user. In accordance with the exemplary embodiment, the access right management unit 14k determines the access right of the user, in particular, determines whether the user has the access right to the confidential information.

The search target index controller 14f switches from one search target index to another depending on the user's access right. Specifically, the search target index controller 14f allows an ordinary user to access the non-confidential information index storage unit 14d with only the non-confidential information index serving as a search target. The search target index controller 14f allows a user having a special right for accessing the confidential information to access the non-confidential information index storage unit 14d and the confidential information index storage unit 14c with the confidential information index in addition to the non-confidential information index serving as search targets.

More specifically, users with ordinary right: non-confidential information index, and users with special right: non-confidential information index+confidential information index. The search index is switchably used depending on the access right of each user.

The search processor 14m, functioning as a searching unit, performs search in accordance with a search condition specified by the user, and returns a search result to the user, namely, the terminal 10, If the search condition is satisfied (is hit), the document data stored in the document storage unit 14e as the search result, namely, the document data having the confidential information concealed therewithin is returned to the terminal 10.

Figure 3:
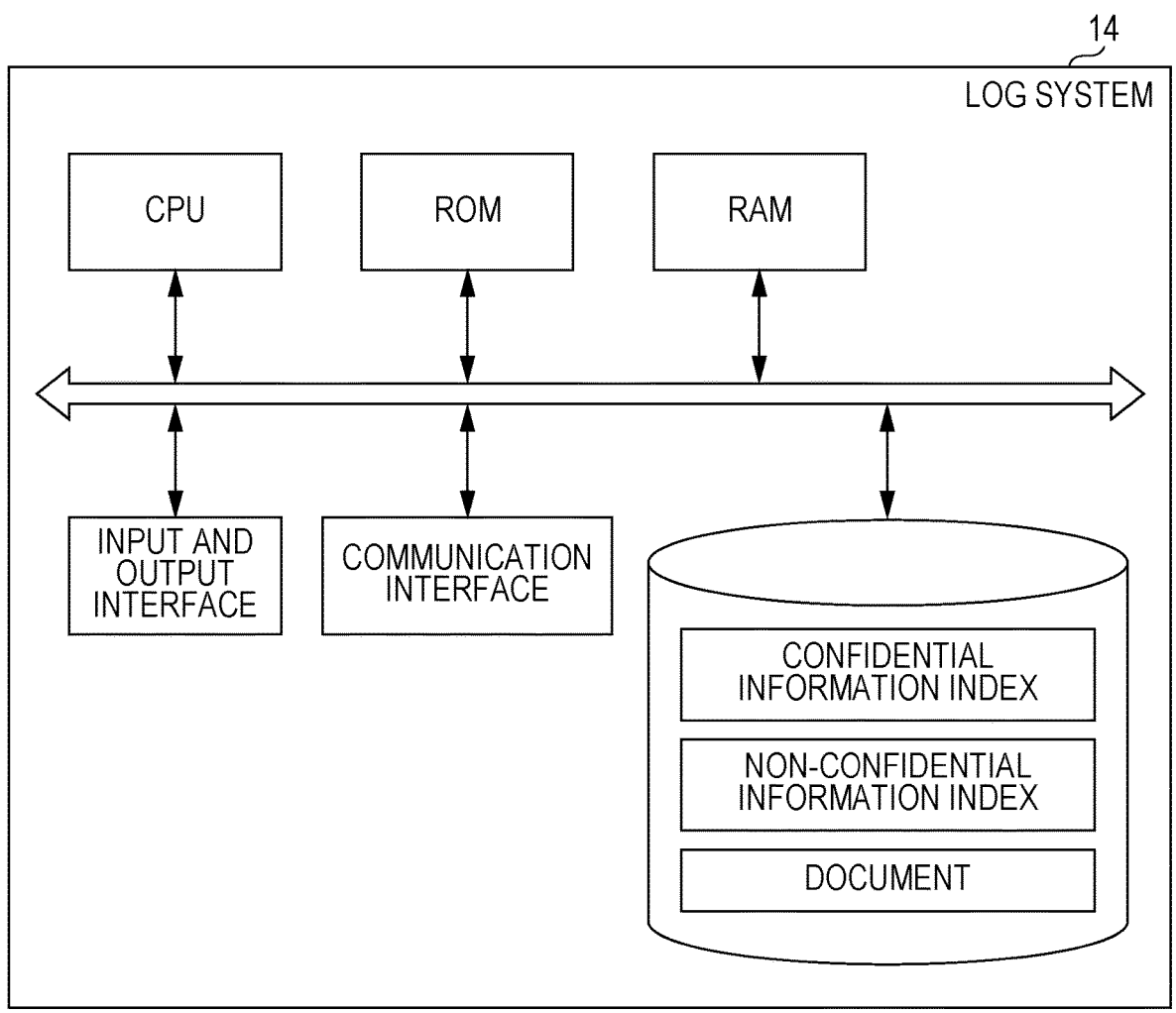
FIG. 3 is a configuration block diagram illustrating the log system of the exemplary embodiment.

FIG. 3 is a configuration block diagram illustrating the log system 14.

The log system 14, functioning as a document management server or a document searching server, has configuration as a server computer. Specifically, the log system 14 includes one or more central processing units (CPUs), a read only memory (ROM), a random access memory (RAM), an input and output interface (I/F), a communication I/F, and a memory. The communication I/F is connected to a communication network, exchanges data with each of the terminal 10 and the document processing apparatus 12. The memory is a hard disk drive (HDD), or a solid-state drive (SSD).

One or more CPUs read and execute processing programs stored on the ROM or memory, thereby implementing the functional blocks of FIG. 2. Upon receiving the document data from the document processing apparatus 12 via the communication I/F, the CPU identifies the confidential information character string from the document data, while also identifying the non-confidential information character string. The CPU generates a confidential information index for the confidential information character string and a non-confidential information index for the non-confidential information character string. The CPU stores the generated confidential information index in a confidential information index storage region of memory, and the generated non-confidential information index on a non-confidential information index storage region of the memory.

One or more CPUs perform a concealment operation by blacking out the confidential information character string identified in the document data and then store the concealment processed document data.

When a user logs in on the log system 14 using the terminal 10, the CPU authenticates the user using an identification and a password of the user, and verifies the access right of the user who has logged in (login user). The access right of each user is specified in the table stored in the memory. By referencing the table, the CPU determines whether the logged-in user has the access right to the confidential information. If the logged-in user has no access right to the confidential information, the CPU performs search using only the non-confidential information index as a search target index. If the logged-in user has a special right to access the confidential information, the CPU performs search using the non-confidential information index and the confidential information index as the search target indexes. The CPU returns the search result to the terminal 10. Given the same search condition, the search result may be different depending on whether the user has the special right or not.

The one or more CPUs function as each of the confidential information character string identifying unit 14g, the non-confidential information character string identifying unit 14b, the confidential information index generating unit 14h, the non-confidential information index generating unit 14i, the confidential information character string concealing unit 14j, the access right management unit 14k, the search target index controller 14f, and the search processor 14m. The communication I/F functions as the document receiving unit 14a. The memory functions as each of the confidential information index storage unit 14c, the non-confidential information index storage unit 14d, and the document storage unit 14e.

Some of the functional blocks of FIG. 2 may be implemented using hardware instead of using software that executes a program. The hardware may be implemented using a circuit, such as an application specific integrated circuit (ASIC) or a field programmable gate array (FPGA).

Figure 4:
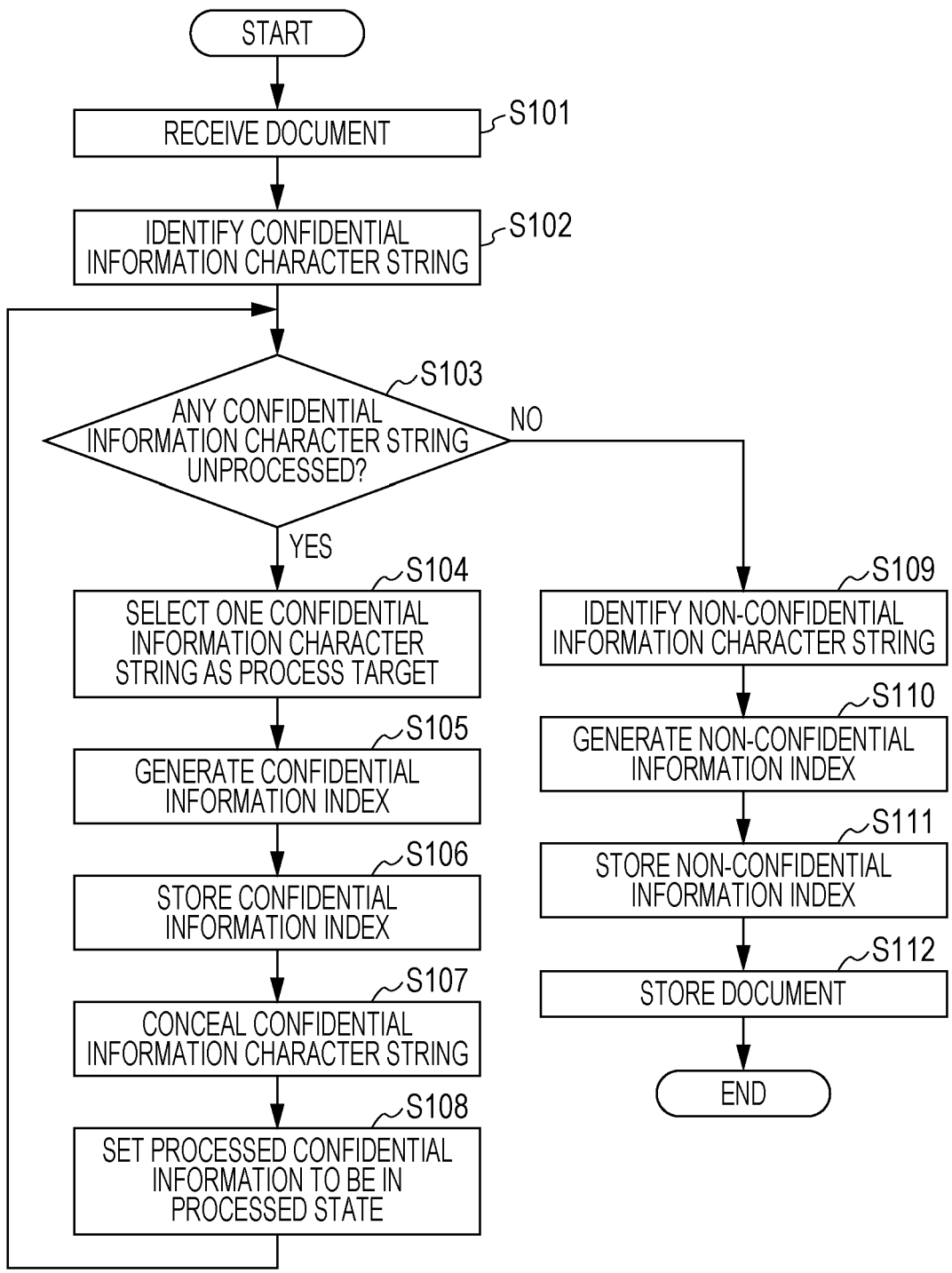
FIG. 4 is a flowchart illustrating a process of the exemplary embodiment.

FIG. 4 is a flowchart illustrating a process of the log system 14 of the exemplary embodiment. The process includes an index generation operation, a concealment operation, and a storage operation.

Upon receiving the document data from the document processing apparatus 12 via the communication I/F (S101), the CPU in the log system 14 identifies all the confidential information character strings in the document data (S102). For example, if a credit card number is included in the document data, that credit card number is identified as a confidential information character string.

The CPU then determines whether there is any unprocessed confidential information character string (S103). The "unprocessed" here means that an index is not produced yet. If there is an unprocessed confidential information character string (yes from S103), the CPU selects one confidential information character string as a process target (S104), and generates a confidential information index from the confidential information character string (S105). Generally, the index is expressed in a form of list of appearing locations of words, characters, and character strings included in the document. The index may be an inverted index that expresses a document where each of the words, characters, and character strings appears, and expresses the location of each of the words, characters, and character strings in the document. In analysis of the words, characters, and character strings in the document, morphological analysis or N-gram may be used. After an index is generated for the confidential information, the confidential information index is stored on the memory, namely the confidential information index storage unit 14c (S106).

The CPU performs the concealment operation on the selected confidential information character string (S107). The concealment operation may black out the character string, for example. The confidential information character string having undergone the concealment operation is marked with a flag indicating completion of concealment (S108). Operations in S104 through S108 are performed on all confidential information character strings in the document data.

The CPU performs the index generation operation, concealment operation, and table addition operation on each of all the confidential information character strings in the document data (no branch from S103). The CPU then identifies a non-confidential information character string (S109), and generates a non-confidential information index from the non-confidential information character string (S110). In a similar manner as in the confidential information character string, the inverted index that expresses a document in which each of the words, characters, and character strings appears, and the location thereof in the document may be used. In analysis of the words, characters, and character strings in the document, morphological analysis or N-gram may be used. After an index is generated for the non-confidential information, the non-confidential information index is stored on the memory, namely the non-confidential information index storage unit 14d (S111).

After the confidential information index and the non-confidential information index are generated and stored, and the confidential information character string is concealed, the CPU stores the concealed document data in the memory, namely, the document storage unit 14e (S112).

Figure 5:
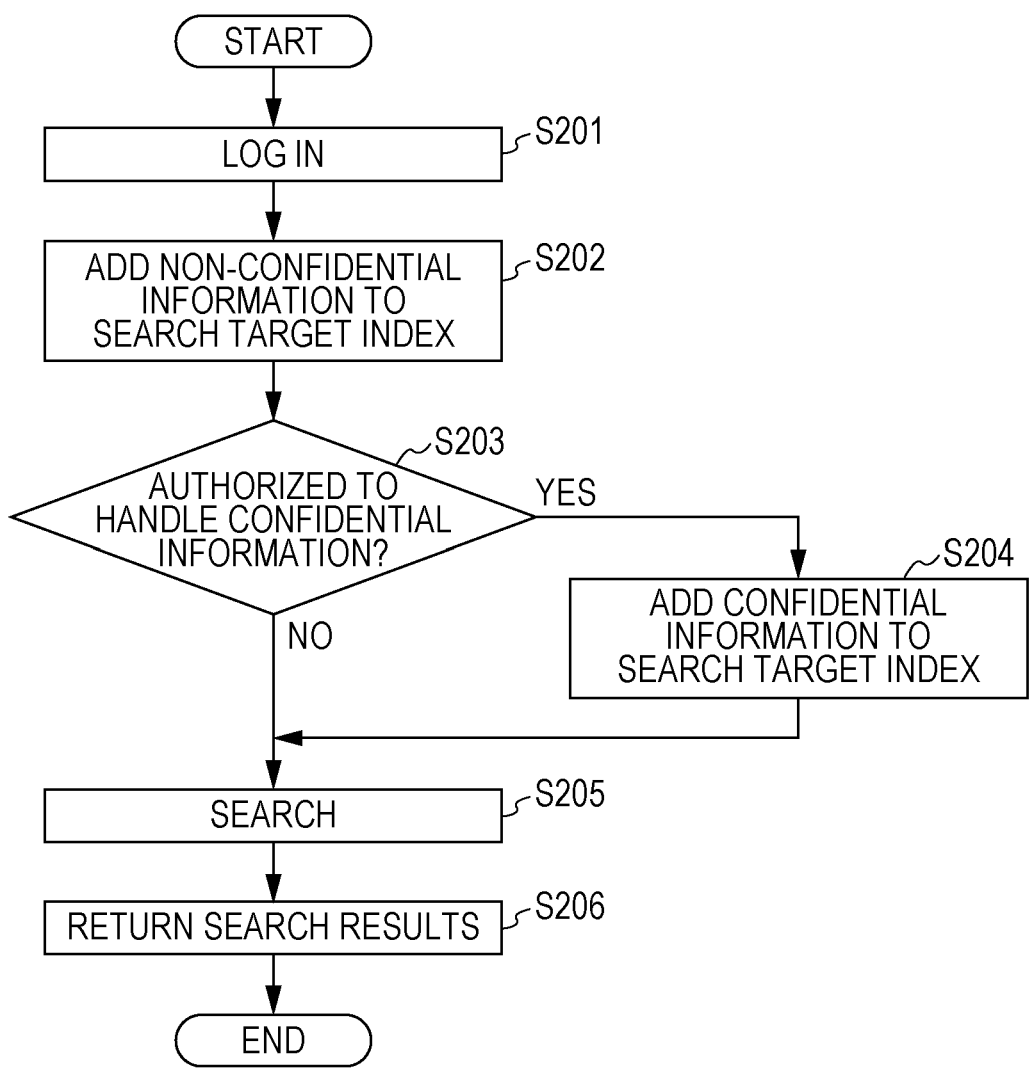
FIG. 5 is a flowchart illustrating another process of the exemplary embodiment.

FIG. 5 is a flowchart illustrating another process performed by the log system 14 of the exemplary embodiment.

The user accesses the log system 14 using the terminal 10, and logs in using an ID and a password (S201). The CPU adds the non-confidential information index as a search target index (S202).

The CPU then verifies the access right of the logged-in user by referencing the table that defines the right of each user in advance, and determines whether the user has the right to access the confidential information (S203).

If the user has no right to access the confidential information. (no branch from S203), the search target index remains unchanged from the index added in S202. On the other hand, if the user has the right to access the confidential information (yes from S203), the CPU adds the confidential information index as a search target index (S204).

After switching from one search target index to another in response to the access right, the CPU performs search using the search target index (S205), and returns the search result to the terminal 10 (S206).

Figure 6:
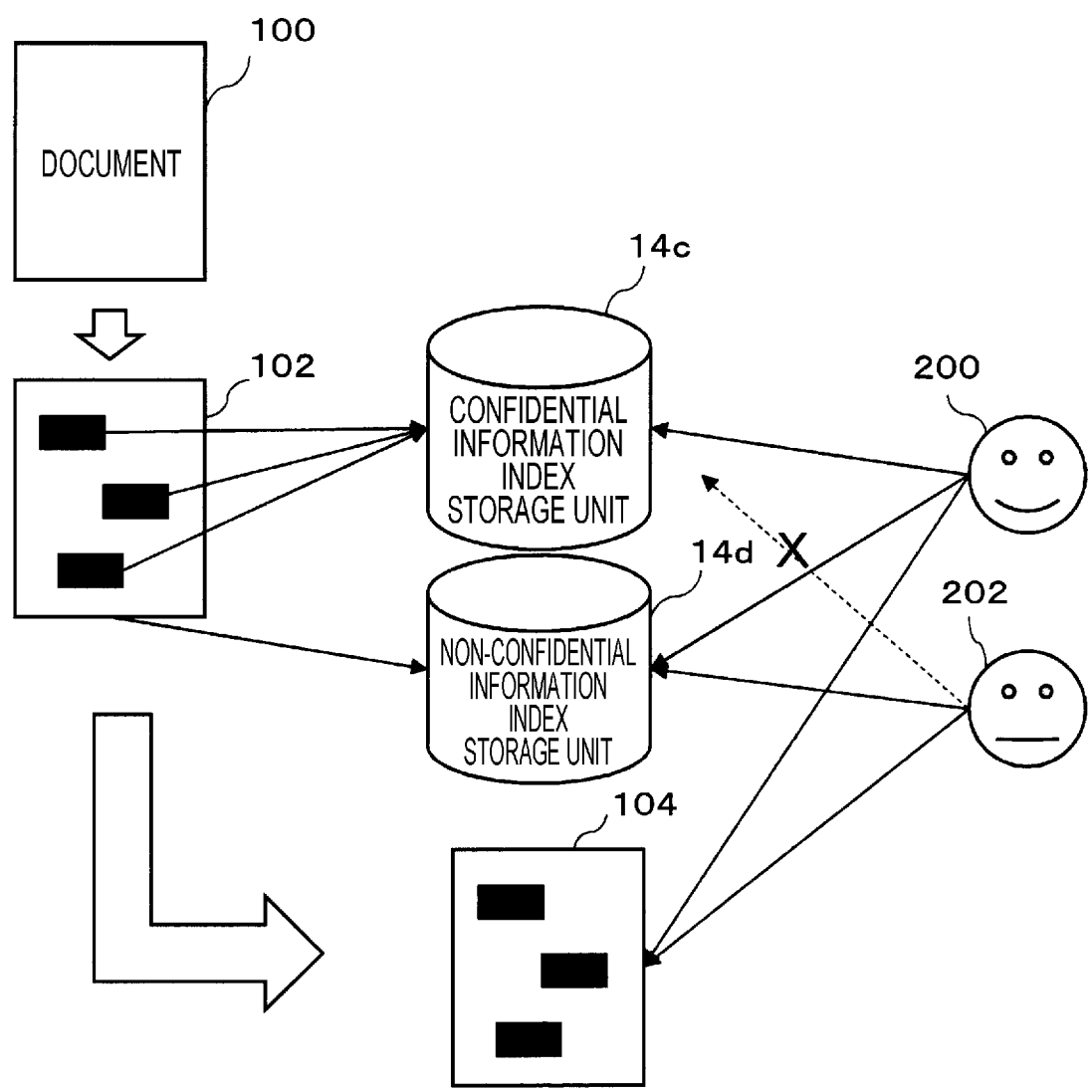
FIG. 6 diagrammatically illustrates a process of the exemplary embodiment.

FIG. 6 diagrammatically illustrates a process of the exemplary embodiment.

A document 100 is received from the document processing apparatus 12, and includes confidential information. The document 100 has not undergone the concealment operation.

The log system 14 identifies a confidential information character string in the document 100, generates a confidential information index for the confidential information character string, and stores the confidential information index on the confidential information index storage unit 14c. The log system 14 generates a non-confidential information index for a non-confidential information character string other than the confidential information character string, and stores the non-confidential information index on the non-confidential information index storage unit 14d. The log system 14 generates a document 102 by performing the concealment operation on the confidential information character string (blacks out the confidential information character string as illustrated in FIG. 6). The document 102 is stored as a document 104 on the document storage unit 14e.

The user performs search on the document 104 stored on the document storage unit 14e. A user 200 having a special right searches the document 104 using the confidential information index stored on the confidential information index storage unit 14c, and the non-confidential information index stored on the non-confidential information index storage unit 14d. If a search key word includes the confidential information index, the confidential information index is hit in the search, and the hit results are returned. The hit results are displayed on the screen of the terminal 10. The user 200 may thus recognize the document 104 (but the confidential information character string is blacked out and remains unrecognizable). On the other hand, a user 202 having no special access right searches the document 104 using only the non-confidential information index stored on the non-confidential information index storage unit 14d. Even if a search key word includes the confidential information character string, the confidential information character string is not hit in the search. The user 202 is unable to recognize the presence of the document 104. Referring to FIG. 6, an arrow-headed broken line and an X symbol indicate that the confidential information index storage unit 14c remains inaccessible.

In accordance with the exemplary embodiment, the access right is not assigned on a per index basis, and search is performed by switching search target indexes on a per access right basis. Confidentiality of a document to be managed is maintained, and searchability is assured without a substantial delay in processing performance.

The exemplary embodiment of the present invention has been described. The present invention is not limited to the exemplary embodiment. The exemplary embodiment may be modified in a variety of forms. Modifications are described below.

First Modification

In accordance with the exemplary embodiment, the confidential information index generating unit 14h generates the confidential information index for the confidential information character string identified by the confidential information character string identifying unit 14g. Alternatively, the confidential information index generating unit 14h may generate the confidential information index by including the confidential information character string and character strings prior to and/or subsequent to the confidential information character string. For example, in the case of character strings "character string A<confidential information character string>character string B", a confidential information index may be generated using character string A<confidential information character string>as a combination of the confidential information character string and the character string A prior to the confidential information character string. Also, a confidential information index may be generated using<confidential information character string>character string B as a combination of the confidential information character string and the character string B subsequent to the confidential information character string. Alternatively, a confidential information index may be generated using character string A<confidential information character string>character string B as a combination of the confidential information character string and the character strings A and B respectively prior to and subsequent to the confidential information character string.

In this way, search is performed using a search key word including a mixture of the non-confidential information and the confidential information.

The administrator may set and register in the log system 14 in advance as to how many strings in the non-confidential character strings prior to and subsequent to the confidential information character string are to be included.

Second Modification

In accordance with the exemplary embodiment, the non-confidential information index generating unit 14i generates an index for the non-confidential information character string other than the confidential information character string. Rather than setting the character string excluding the confidential information character string to be the non-confidential information character string, the non-confidential information index generating unit 14i may replace the confidential information character string with a different character string (a dummy character string), and may generate an index for the non-confidential information character string including the dummy character string. For example, "character string A<confidential information character string>character string B" may now be considered. If the confidential information character string is excluded, a key word will be "character string A character string B" and may not be hit.

Thus, the confidential information character string is replaced with a dummy character string, resulting in "character string A * * * character string B" as a non-confidential information character string. Here, * * * are symbols that are not used in search (symbols include a control code).

In this way, this precludes the generation of an index that is a link of the non-confidential information character strings prior to and subsequent to the confidential information character string.

Third Modification

In accordance with the exemplary embodiment, the character strings of the document data are sorted into the confidential information character strings and the non-confidential information character strings. The confidential information character strings may be sorted according to multiple levels depending on the degree of confidentiality, and an index may be generated depending on the level of confidentiality. For example, the confidential information character strings may be sorted into the confidential information character strings at a level 1 and the confidential information character strings at a level 2 (the level 2 has a higher degree of confidentiality than the level 1). A confidential information index at the level 1 is generated for the confidential information character string at the level 1 and stored on the memory, and a confidential information index at the level 2 is generated for the confidential information character string at the level 2 and stored on the memory. Search is performed depending on the access right of each user. For example, search may be performed using the non-confidential information index for a user having no special right. Search may be performed by adding the confidential information index at the level 1 for a user having a special right at the level 1, and search may be performed by adding the confidential information index at the level 2 for a user having a special right at e level 2.

Fourth Modification

In accordance with the exemplary embodiment, the first memory, the second memory, and the third memory are included in the same memory. These memories may be separate memory media. For example, a storage medium forming the first memory may be different from a storage medium forming the second memory and a storage medium forming the third memory.

In accordance with the exemplary embodiment, the confidential information index storage unit 14c is differentiated from the non-confidential information index storage unit 14d as illustrated in FIG. 2. The confidential information index storage unit 14c and the non-confidential information index storage unit 14d are not necessarily different units. The confidential information index and the non-confidential information index may be simply managed as different search indexes. For example, the confidential information index may be stored with a flag indicating the confidential information index.

Fifth Modification

In accordance with the exemplary embodiment, the log system 14 identifies the confidential information included in the received document data. Alternatively, a unit other than the log system 14 may identify the confidential information and transfer the identified confidential information to the log system 14.

In the configuration of FIG. 1, the document processing apparatus 12 transmits the document data to the log system 14. Alternatively, the document processing apparatus 12 may identify the confidential information in the document data, and may transmit the identified confidential information together with the document data to the log system 14.

Sixth Modification

In accordance with the exemplary embodiment, the confidential information index is generated from the confidential information, and the non-confidential information index is generated from the non-confidential information. Alternatively, the first search index may be generated from the whole document data including the confidential information and the second search index may be generated from the non-confidential information excluding the confidential information. In such a case, the search using the first search index is performed for a user having a special right, and the search using the second search index is performed for a user having no special right.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment chosen and described in order to best explain the principles of the invention and its practical applications, thereby enabling others skilled in the art to understand the invention for various embodiments and with the various modifications as are suited to the special use contemplated. It is intended that the scope of the invention be defined by the following claims and their equivalents.

What is claimed is:

1. A document management apparatus comprising:
   a first memory that stores a first search index generated for confidential information included in document data;
   a second memory that stores a second search index generated for non-confidential information other than the confidential information;
   a third memory that stores the document data including the confidential information concealed therewithin; and
   a controller that searches the document data by switching between the first search index and the second search index depending on a right of a user, and outputs a search result,
   wherein the first search index is generated from a linked character string of a character string of the confidential information and at least one of character strings of non-confidential information prior to and subsequent to the character string of the confidential information.

2. The document management apparatus according to claim 1, wherein the controller searches the document data using the first search index and the second search index for a user having a special right, and searches the document data using the second search index for a user having no special right.

3. The document management apparatus according to claim 2, wherein the first search index is generated from a character string of the confidential information.

4. The document management apparatus according to claim 3, wherein the second search index is generated by replacing a character string of the confidential information with a dummy character string.

5. The document management apparatus according to claim 2, wherein the second search index is generated by replacing a character string of the confidential information with a dummy character string.

6. The document management apparatus according to claim 5, wherein the dummy character string comprises a symbol that is not used in searching.

7. The document management apparatus according to claim 1, wherein the controller searches the document data using the first search index for a user having a special right, and searches the document data using the second search index for a user having no special right.

8. The document management apparatus according to claim 7, wherein the second search index is generated by replacing a character string of the confidential information with a dummy character string.

9. The document management apparatus according to claim 1, wherein the first search index is generated from a character string of the confidential information.

10. The document management apparatus according to claim 9, wherein the second search index is generated by replacing a character string of the confidential information with a dummy character string.

11. The document management apparatus according to claim 1, wherein the second search index is generated by replacing a character string of the confidential information with a dummy character string.

12. The document management apparatus according to claim 11, wherein the dummy character string comprises a symbol that is not used in searching.

13. A document management system comprising:
a document processing apparatus;
a document management apparatus that receives document data from the document processing apparatus, the document management apparatus including a first memory that stores a first search index generated for confidential information included in the document data, a second memory that stores a second search index generated for non-confidential information other than the confidential information, a third memory that stores the document data including the confidential information concealed therewithin, and a controller that searches the document data by switching between the first search index and the second search index depending on a right of a user, and outputs a search result; and
a terminal that transmits a search condition to the document management apparatus and receives the search result from the document management apparatus,
wherein the first search index is generated from a linked character string of a character string of the confidential information and at least one of character strings of non-confidential information prior to and subsequent to the character string of the confidential information.

14. A non-transitory computer readable medium storing a program causing a computer to execute a process for managing document data, the process comprising:
generating a first search index for confidential information included in the document data;
storing on a first memory the first search index generated;
generating a second search index for non-confidential information other than the confidential information;
storing on a second memory the second search index generated;
concealing the confidential information in the document data;
storing on a third memory the document data including the concealed confidential information;
searching the document data on a per right basis of a user by switching between the first search index and the second search index; and
outputting a search result,
wherein the first search index is generated from a linked character string of a character string of the confidential information and at least one of character strings of non-confidential information prior to and subsequent to the character string of the confidential information.

\* \* \* \* \*